United States Patent [19]

Saeger et al.

[11] Patent Number: 5,294,987
[45] Date of Patent: Mar. 15, 1994

[54] FIELD TO FIELD VERTICAL PANNING SYSTEM

[75] Inventors: Timothy W. Saeger; David J. Duffield, both of Indianapolis, Ind.

[73] Assignee: Thomson Consumer Electronics, Inc., Indianapolis, Ind.

[21] Appl. No.: 911,648

[22] Filed: Jul. 10, 1992

[51] Int. Cl.$^5$ .......................................... H04N 3/227
[52] U.S. Cl. ..................................... 348/536; 348/704
[58] Field of Search ............... 358/148, 158, 150, 180, 358/160, 22; H04N 3/220, 3/227, 5/040, 5/060, 5/120

[56] References Cited

U.S. PATENT DOCUMENTS

| | | | |
|---|---|---|---|
| 3,878,327 | 4/1975 | Uhler | 178/7.5 R |
| 4,079,413 | 3/1978 | Yamashita | 358/83 |
| 4,163,992 | 8/1979 | Inaba et al. | 358/183 |
| 4,249,213 | 3/1981 | Imaide et al. | 358/183 |
| 4,581,640 | 4/1986 | Cole | 358/12 |
| 4,679,080 | 7/1987 | Bushford | 358/150 |
| 4,746,981 | 5/1988 | Nadan et al. | 358/160 |
| 4,800,430 | 1/1989 | Murakami et al. | 358/160 |
| 4,821,086 | 4/1989 | McNeely et al. | 358/22 |
| 4,878,117 | 10/1989 | Ikehira et al. | 358/183 |
| 4,891,705 | 1/1990 | Suzuki et al. | 358/148 |

FOREIGN PATENT DOCUMENTS

| | | | |
|---|---|---|---|
| 0041922 | 4/1978 | Japan | 358/148 |
| 0119579 | 9/1981 | Japan | 358/158 |
| 0162874 | 6/1990 | Japan | |
| 4003662 | 1/1992 | Japan | |

WO91/19378 12/1991 World Int. Prop. O. .

OTHER PUBLICATIONS

Patent Abstracts of Japan, vol. 12, No. 474 (E-692) Dec. 12, 1988, corresponding to JP A 63-193779, Aug. 11, 1988.
Patent Abstracts of Japan, vol. 12, No. 412 (E-676) Oct. 31, 1988, corresponding to JP A 63-148780, Jun. 21, 1988.

Primary Examiner—James J. Groody
Assistant Examiner—David E. Harvey
Attorney, Agent, or Firm—Joseph S. Tripoli; Joseph J. Laks; Harvey D. Fried

[57] ABSTRACT

A television apparatus includes a display for a video signal representing a picture. The video signal has a vertical synchronizing component defining fields of horizontal lines which can have other than a standard number of horizontal lines per field under certain operating conditions. A counter measures the number of horizontal lines in each field. A panning circuit generates a vertical reset signal which is phase shifted by a selected number of horizontal lines relative to the vertical synchronizing component of the video signal for vertically panning the picture on the video display by the selected number of horizontal lines. The selected number of horizontal lines is adjusted responsive to the measured lengths of the fields to maintain the selected amount of vertical panning even under the certain operating conditions.

26 Claims, 12 Drawing Sheets

FIELD TO FIELD VERTICAL PANNING SYSTEM

The invention relates to television receivers operable to display an image which does not correspond to the aspect ratio of the display, including means for controllably panning the image vertically. In particular, the invention provides a means for generating vertical reset and blanking signals for panning in a wide screen television apparatus, in a manner which accommodates certain display situations wherein the number of vertical lines in successive video fields is unequal, and/or of a length which differs from a standard length and may be less than the delay needed to accomplish upward panning for a standard field length.

The most conventional television receiver has a format display ratio measuring four horizontal units by three vertical units, generally referred to as 4×3, and most commercial broadcasters, except for experimental purposes, produce signals which correspond to this ratio. Movies, on the other hand, are often produced in a format display ratio which is relatively wider in its horizontal direction, for example 16×9 (i.e., 4×2.25). Various specific ratios are possible. Viewers have come to associate the relatively wider presentation with movies and the relatively narrower presentation with home viewing. As a result, many viewers find the wider format display ratio more pleasing in that it looks like a movie instead of a conventional commercial broadcast.

When displaying a program having a wide screen format display ratio on a 4×3 screen, or when displaying a 4×3 program on a wide screen display, it is necessary to accommodate the difference. In a so-called "letterbox" arrangement, a wide screen signal is displayed on a 4×3 ratio display, with bands at the top and/or bottom of the display left blank or used for messages, simultaneous display of other images or the like. Conversely, in displaying a 4×3 signal on a wide screen display, unused side areas can display simultaneous images or the like.

A wide screen television receiver can be arranged to display television signals in a variety of ways. The receiver can detect signals in letterbox format, and expand the 4×3 received signal such that the blank top and bottom bands are cropped and the signal fills a 16×9 display area. The receiver can also expand or zoom a non-letterbox signal (e.g., 4×3) while cropping active video areas at the top and bottom, to fill the wide screen display. Along with this feature is the additional capability to generate vertical blanking and reset signals to display the zoomed source.

It can be a complicated problem to arrange to display both conventional and wide display format signals, as well as combinations thereof, including multiple picture displays. Changing the display format ratios of multiple signal sources may entail developing consistent timing signals from asynchronous sources, switching between multiple sources, compressing the signals, expanding the signals with additional interpolated lines, or various combinations thereof.

Not all letterbox signals are centered vertically. Where a 4×3 signal is zoomed, thereby cropping vertically, it may be desirable to crop the top more than the bottom, or vice versa, such that the more interesting portion of the signal is retained. Therefore, a vertical panning capability is advantageous.

A vertical display control circuit controls which part of the overscanned raster will be displayed on the screen, which is described herein as vertical panning. If the vertically overscanned video signal is not in letterbox format, the picture can be zoomed, that is expanded both vertically and horizontally, to simulate a wide screen display format without distorting the displayed portion of the signal. Assuming, by way of example, a change from a 4×3 signal to a 16×9 display (although other specific ratios are possible), one third of the vertical dimension of the picture is cropped. Many vertical deflection systems are AC-coupled. As a result, pictures are always vertically centered on the display. For a 4:3 picture zoomed for display on a 16:9 display, the top one sixth and bottom one sixth of the picture will always be cropped.

The picture content may make it more appropriate to crop more at the top or bottom, while retaining the content at the other. For example, where the action in a picture is at ground level, the viewer might prefer to crop more of the sky. A vertical panning capability enables a choice as to which part of the zoomed picture will be cropped. This can be accomplished by generation of a vertical reset pulse that is delayed by a selectably variable amount from the leading edge of a processed vertical synchronizing pulse based on the video signal received, referred to as VSYNC. A vertical blanking pulse is likewise generated. The vertical reset pulse is used by the chassis to initiate a vertical retrace, and during the blanking interval defined by the vertical blanking pulse the electron beam is disabled. Since the video output of the wide screen processor is not delayed, a vertical panning feature is created by the appropriate manipulation of vertical blanking and vertical reset pulse delay relative to VSYNC.

One may wish to pan up or down. Panning directions are defined herein in terms of the direction in which the field of view moves over the expanded or zoomed picture. Panning down, for example, will reveal picture content in a lower part of the zoomed picture and will crop picture content from an upper part of the zoomed picture. Panning the video down may also be thought of as scrolling the picture up. Conversely, panning the video up may also be thought of as scrolling the video down. Panning down involves a delay of vertical reset and blanking for each field (of two interleaved fields) by some number of horizontal lines which is less than that of the field. For NTSC, each field is 262.5 lines. Panning up, on the other hand, would require moving the vertical reset and blanking pulses ahead in time relative to VSYNC, which of course is not possible in an AC-coupled vertical deflection system if VSYNC is the triggering signal.

A problem is encountered when vertical panning is used in conjunction with certain special effects modes, for example during VCR playback. In fast forward mode of a VCR, due to the non-standard nature of the linear tape speed, the number of lines in a field is decreased relative to the standard number by a number of lines which is dependent on the recording mode used (for example, SP or SLP) and the linear tape speed. In the example of a five line down-pan, and assuming a nominal number of lines in the field of 253.5 (characteristic of VCR fast forward playback of a tape recorded in SP mode), the delay for the desired pan is 257.5 lines. However, a new VSYNC occurs every 253.5 lines. The new VSYNC which is the triggering signal on which the delay is based, resets the line counter. As a result, no vertical reset occurs because the line counter is repeatedly reset without ever reaching the desired delay value. Without a vertical reset, the raster collapses vertically, possibly causing damage to the phosphors of the picture tube.

In order to ensure that this condition cannot occur, it is known to force the occurrence of a vertical reset pulse regardless of the phase difference between VSYNC and the vertical reset. The vertical reset is generated by VSYNC (without a delay) if a second VSYNC occurs before the line count reaches the desired panning delay. The vertical panning circuit for displaying a selected (vertically cropped) portion of a zoomed picture provides a line count defining the video line delay interval for initiating vertical reset and blanking pulses which are delayed relative to the vertical synchronizing component VSYNC of the video signal. A line counter generates the delayed reset pulses when fields occur having numbers of video lines greater than or equal to the line delay interval, which is the usual condition. Additionally, a gating circuit is provided, responsive to the vertical synchronizing component, to generate the reset and blanking pulses when fields occur that have a number of lines less than the panning delay interval. Thus, panning is made possible and the raster cannot collapse.

Both panning up and panning down may be accomplished by delaying the vertical reset signal by a number of half lines less than or equal to that of one field. For a standard NTSC signal comprising fields having 262.5 lines (i.e., 525 half lines), the panning down delay is between zero and 262.5 half lines. The panning up delay is between 262.5 and 525 half lines. However, this solution still will not accommodate non-standard signals which are produced, for example, in certain modes of VCR playback. Where the non-standard signal is such that the field lengths are not equal, such as pause for a dual azimuth four head VCR, panning up produces an interline flicker with the offset between fields being equal to the difference in the number of lines between successive fields. The respective lines of the successive fields displayed are not aligned. The result is a very severe artifact which effectively makes the picture unwatchable.

In other VCR modes, the field lengths may be equal, but not of a standard length (i.e., number of horizontal lines). In visual search modes, for example, the field lengths may be equal, but shorter than standard for forward searching and longer than standard for reverse searching. The specific number by which the field line count differs from standard depends on the recording speed and on the search speed, and can be, for example, ±10 lines. The variation in field line length causes the upward pan delay to pan by too much or too little when operating in the search modes, as compared to operating in the standard mode. In other words, the variation in field line length can cause additional, undesired panning. This occurs because the pan delay is referenced to the previous vertical sync on the assumption that the field length is standard. However, the amount of upward pan obtained is a function of the phase relationship between the vertical reset pulse generated by the pan delay circuit, and the beginning of the next field, i.e., the next VSYNC. Where the number of lines in the field varies, the phase relationship of the vertical reset and the next VSYNC must vary as well.

OBJECT OF THE INVENTION

It is an aspect of the invention to provide a vertical panning system particularly suited for AC-coupled vertical deflection systems.

It is a further aspect of the present invention to accommodate zooming and panning in a non-standard display situation characterized by field lengths which vary from standard. This is accomplished by adjusting the delay for the vertical reset based on the field length, on a field to field basis. The vertical reset delay is reduced for a shortened field and increased for a lengthened field.

It is another aspect of the invention to control interline flicker and prevent additional panning in a situation where successive fields of the same frame have different lengths, by ensuring that the distance between the vertical reset pulse and the beginning of each video field is constant. In this manner the lines of successive fields always align, even where the fields have different line counts.

It is yet another aspect of the invention to generate pan-delayed signals for both vertical reset and vertical blanking, according to a user selectable amount of up or down panning.

These and other aspects of the invention are provided in a television apparatus comprising a display for a video signal representing a picture, a measuring circuit, a panning circuit and an adjusting circuit. The video signal has a vertical synchronizing component defining fields of horizontal lines which can have other than a standard number of horizontal lines per field under certain operating conditions. The measuring circuit determines the number of horizontal lines in each field. The panning circuit generates a vertical reset signal which is phase shifted by a selected number of horizontal lines relative to the vertical synchronizing component of the video signal for vertically panning the picture on the video display by the selected number of horizontal lines. The selected number of horizontal lines is adjusted responsive to the measured lengths of the fields to maintain the selected amount of vertical panning even under the certain operating conditions.

The measuring circuit comprises: first and second counters; first and second latches coupled to the first counter; a gating circuit coupled to the first and second latches for selecting which of the first and second latches loads an input from the first counter; and, a first multiplexer responsive to the second counter for selecting an output between the first and second latches. The adjusting circuit comprises: a second multiplexer for selecting as an output between: (a) successive ones of the selected number of horizontal lines; and, (b) an algebraic sum of the successive ones of the selected number of horizontal lines and successive ones of the measured lengths, the second multiplexer being responsive to a sign-representative bit of the phase shift; and, a comparator for generating an output signal for initiating the vertical reset signal when the length of a field being measured reaches the output value of the second multiplexer.

DETAILED DESCRIPTION

Figure 1:
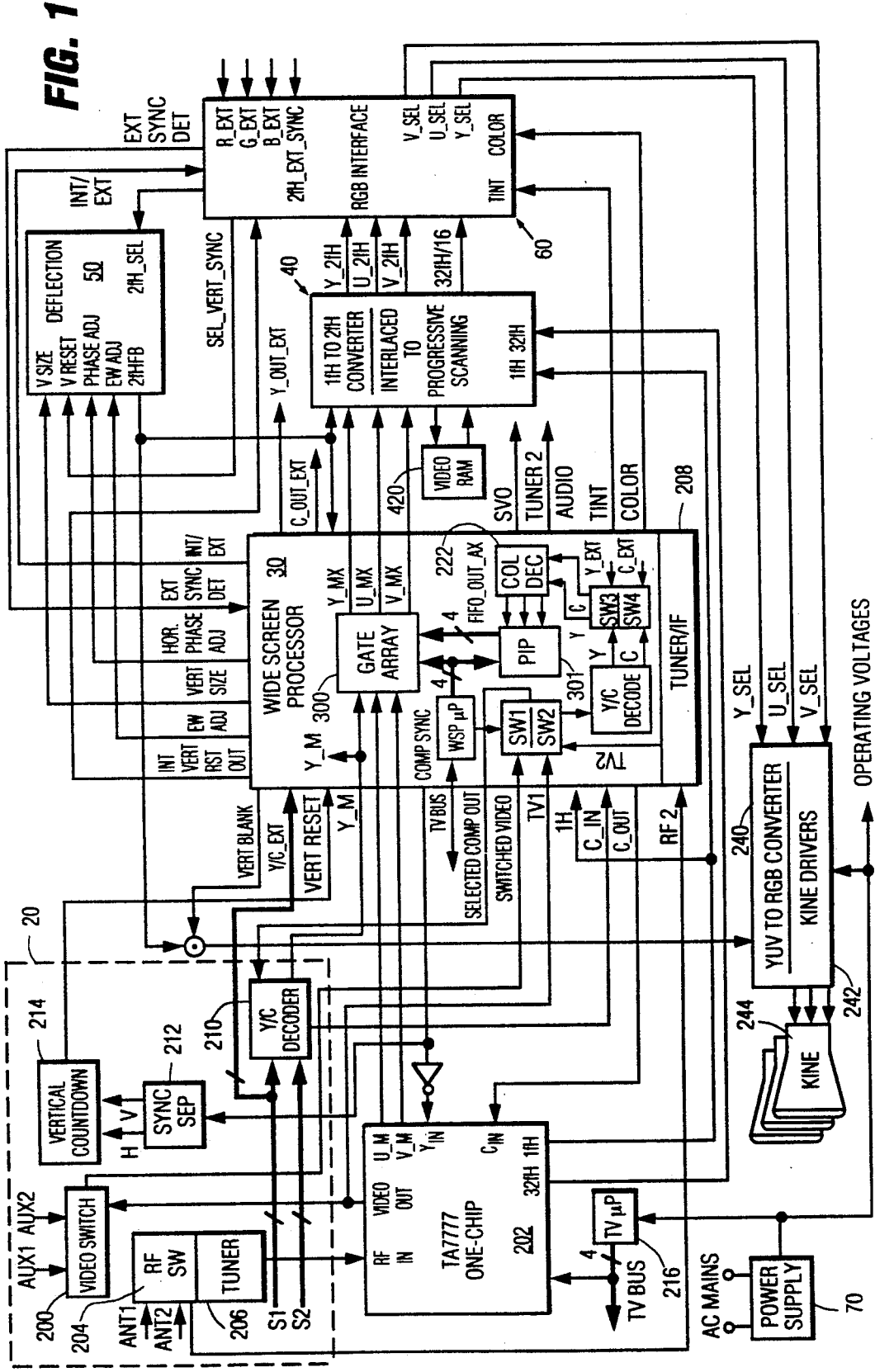
FIG. 1 is a schematic diagram generally illustrating the component parts of a wide screen television apparatus according to the invention.

A block diagram for a wide screen television according to the invention is shown in FIG. 1. The television can be arranged to operate with $2f_H$ non-interlaced horizontal scanning or with conventional horizontal scanning, a non-interlaced version being shown. The television receiver in general comprises a power supply 70, a video signal input section 20, a chassis or TV microprocessor 216 coupled to a one-chip processor 202, a wide screen processor 30, a $1f_H$ to $2f_H$ converter 40, a deflection circuit 50, an RGB interface 60, a YUV to RGB converter 240, kine drivers 242, and display tube arrangement 244, which may be arranged for projection or direct view. The grouping of the various circuits into functional blocks is made for convenience in describing operation of the television, and is not intended to be limiting as to the physical positions and functional coupling of the circuits relative to one another.

The video signal input section 20 can receive, select or display simultaneously a plurality of composite video signals from different sources, e.g., broadcast or cable signals at ANT1 and ANT2, selectable by RF switch 204 for coupling to first tuner 206 and second tuner 208. The output of the first tuner 206 is coupled to one-chip circuit 202, for example industry designated type TA7730, which performs certain tuning, deflection and video control functions. A VIDEO OUT baseband signal from the one-chip 202 is coupled to video switch 200 and to TV1 input of wide screen processor 30. Auxiliary inputs AUX1 and AUX2 are available for other sources such as video cameras, laser disc players, video tape players, video games, etc., and are selected by video switch 200 for coupling to the SWITCHED VIDEO input to wide screen processor 30. The selected composite video signal (SELECTED COMP OUT) is input to Y/C decoder 210, together with further video sources S1, S2, and responsive to TV microprocessor 216 selects a pair of luminance and chrominance signals (thereafter considered the "main" signal), for coupling to the wide screen processor 30 as Y_M and C_IN. These signals are coupled back to the one-chip 202, for developing color difference signals U_M and V_M, equivalent to R−Y and B−Y signals. These signals are converted to digital form for further processing.

The second tuner 208 develops baseband video signal TV2, selectable for input to the Y/C decoder together with SWITCHED VIDEO. Switches SW3 and SW4 select these signals Y, C, or external signals Y_EXT and C_EXT corresponding to input S1, considered the auxiliary signal. The main signal path is designated with the suffix "_M" and the auxiliary signal path is designated "_A" in the respective signals. The respective signals can be processed for display alternatively or for display in a picture-in-picture mode via PIP circuit 301.

A composite synchronizing signal COMP SYNC, corresponding to Y_M, is provided by wide screen processor 30 to a sync separator 212, producing horizontal and vertical synchronizing signals H and V, which are input to vertical countdown circuit 214. The vertical countdown circuit develops a VERTICAL RESET signal coupled to the wide screen processor 30. The wide screen processor generates an internal vertical reset output signal IN VERT RST OUT to RGB interface 60, and a switch in the RGB interface selects between the internal vertical reset output signal and the vertical synchronizing component of the external RGB source. The output of this switch is a selected vertical synchronizing component SEL_VERT_SYNC, directed to the deflection circuit 50. Horizontal and vertical synchronizing signals for the auxiliary video signal are developed by a sync separator in the wide screen processor 30.

The $1f_H$ to $2f_H$ converter 40 changes interlaced video signals to progressively scanned, non-interlaced signals. Video RAM 420 can be used to store an adjacent field or frame for supplying the lines, or every other line, or lines can be repeated or interpolated, e.g., displaying horizontal lines twice or selecting a line based on detected movement in the picture. The converted video data is supplied to RGB interface 60 as Y_2$f_H$, U_2$f_H$ and V_2$f_H$. The RGB interface enables selection of the converted video data or an external RGB video signal, then coupled to the video signal input section. External RGB is deemed to be a wide format display ratio signal adapted for $2f_H$ scanning. The vertical synchronizing component of the main signal is coupled to the RGB interface (as INT VERT RST OUT), for selecting the vertical sync applied to the deflection circuit 50, together with the user's selection of internal or external RGB signals. However, to prevent vertical raster collapse, the RGB interface circuit detects an external synchronizing signal and will override the selection of a non-existent external RGB signal. A microprocessor WSP µP in wide screen processor 30 supplies color and tint controls for external RGB.

A picture-in-picture processor 301, in conjunction with gate array 300 combines the main and auxiliary video signal data to provide a wide variety of display formats which can be selected, for example with a compressed version of an auxiliary signal displayed in the top or bottom margins of a letterbox main display signal, along the lateral sides of a 4×3 main display signal, etc. The wide screen microprocessor WSP µP is responsive to the TV microprocessor 216 over a serial bus. The wide screen processor 30 also generates a composite vertical blanking/reset signal, as a three level sandcastle signal. The vertical blanking and reset signals can also be generated as separate signals, as discussed more fully hereinafter, in connection with panning controls. A composite blanking signal is supplied by the video signal input section to the RGB interface.

Figure 2:
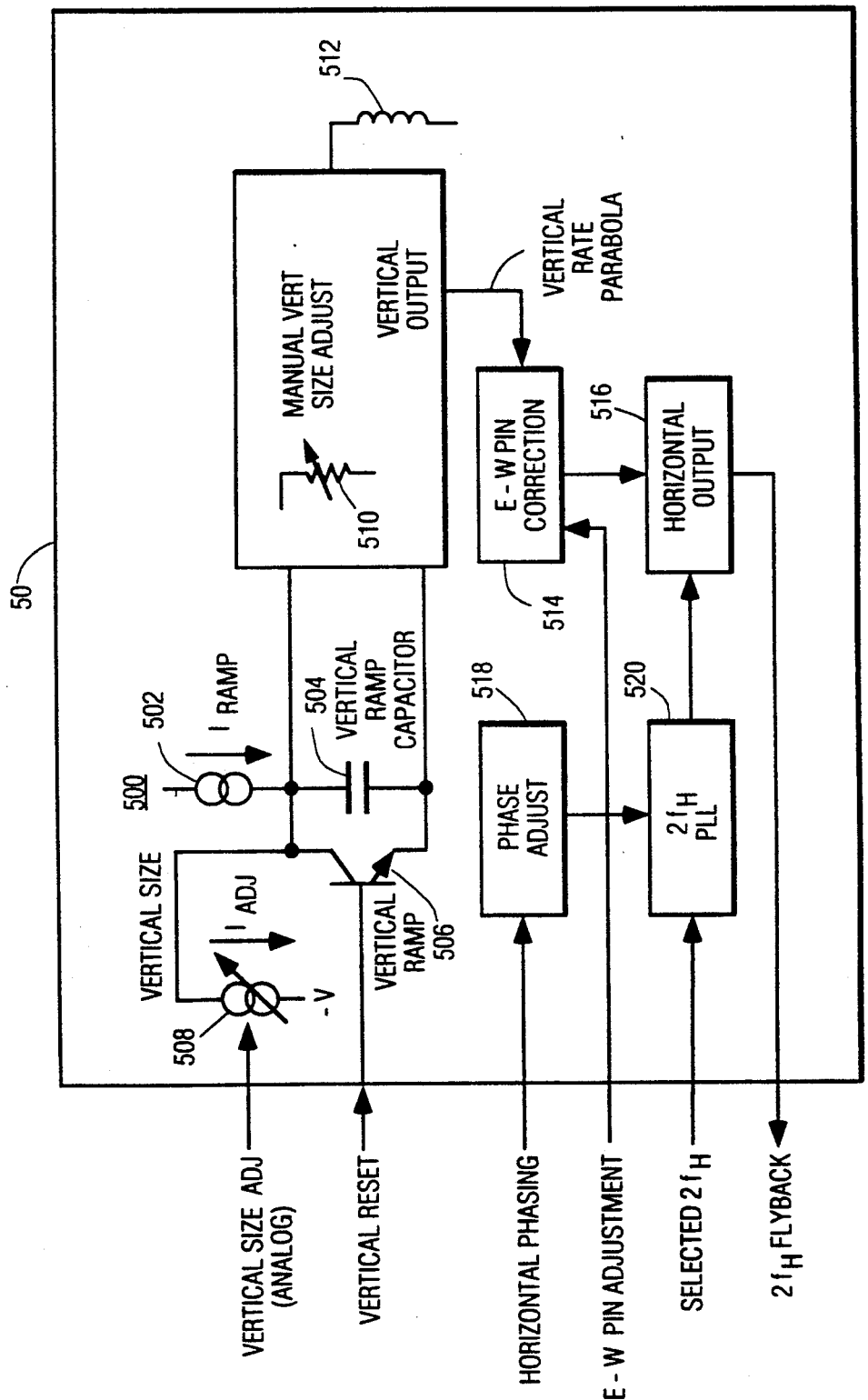
FIG. 2 is a combination block and circuit diagram illustrating the deflection circuit shown in FIG. 1.

The deflection circuit 50, shown in more detail in FIG. 2, receives a vertical reset signal from the wide screen processor 30, a selected $2f_H$ horizontal synchronizing signal from the RGB interface 60, and additional control signals from the wide screen processor. The additional control signals relate to horizontal phasing, vertical size adjustment and east-west pin adjustment. The deflection circuit 50 supplies $2f_H$ flyback pulses to the wide screen processor 30, the $1f_H$ to $2f_H$ converter 40 and the YUV to RGB converter 240.

The deflection circuit 50 is shown in more detail in FIG. 2. A circuit 500 is provided for adjusting the vertical size of the raster, in accordance with a desired amount of vertical overscan as necessary for implementing different display formats. As illustrated diagrammatically, a constant current source 502 provides a constant quantity of current $I_{RAMP}$ which charges a vertical ramp capacitor 504. A transistor 506 is coupled in parallel with the vertical ramp capacitor, and periodically discharges the capacitor responsive to the vertical reset signal. In the absence of any adjustment, current $I_{RAMP}$ provides the maximum available vertical size for the raster. This might correspond to the extent of vertical overscan needed to fill the wide screen display vertically by expanding a 4×3 format letterbox signal source such that the unused top and bottom portions are overscanned. To the extent that less vertical raster size is required, an adjustable current source 508 diverts a variable amount of current $I_{ADJ}$ from $I_{RAMP}$, so that the vertical ramp capacitor 504 charges more slowly and to a smaller peak value. Variable current source 508 is responsive to a vertical size adjust signal, for example in analog form, generated by vertical size control circuit 1030, shown in FIG. 2. Vertical size adjustment 500 is independent of a manual vertical size adjustment 510, which may be implemented by a potentiometer of back panel adjustment knob. In either event, the vertical deflection coil(s) receive(s) driving current of the proper magnitude. Horizontal deflection is provided by phase adjusting circuit 518, east-west pin correction circuit 514, a $2f_H$ phase locked loop 520 and horizontal output circuit 516.

Figure 3:
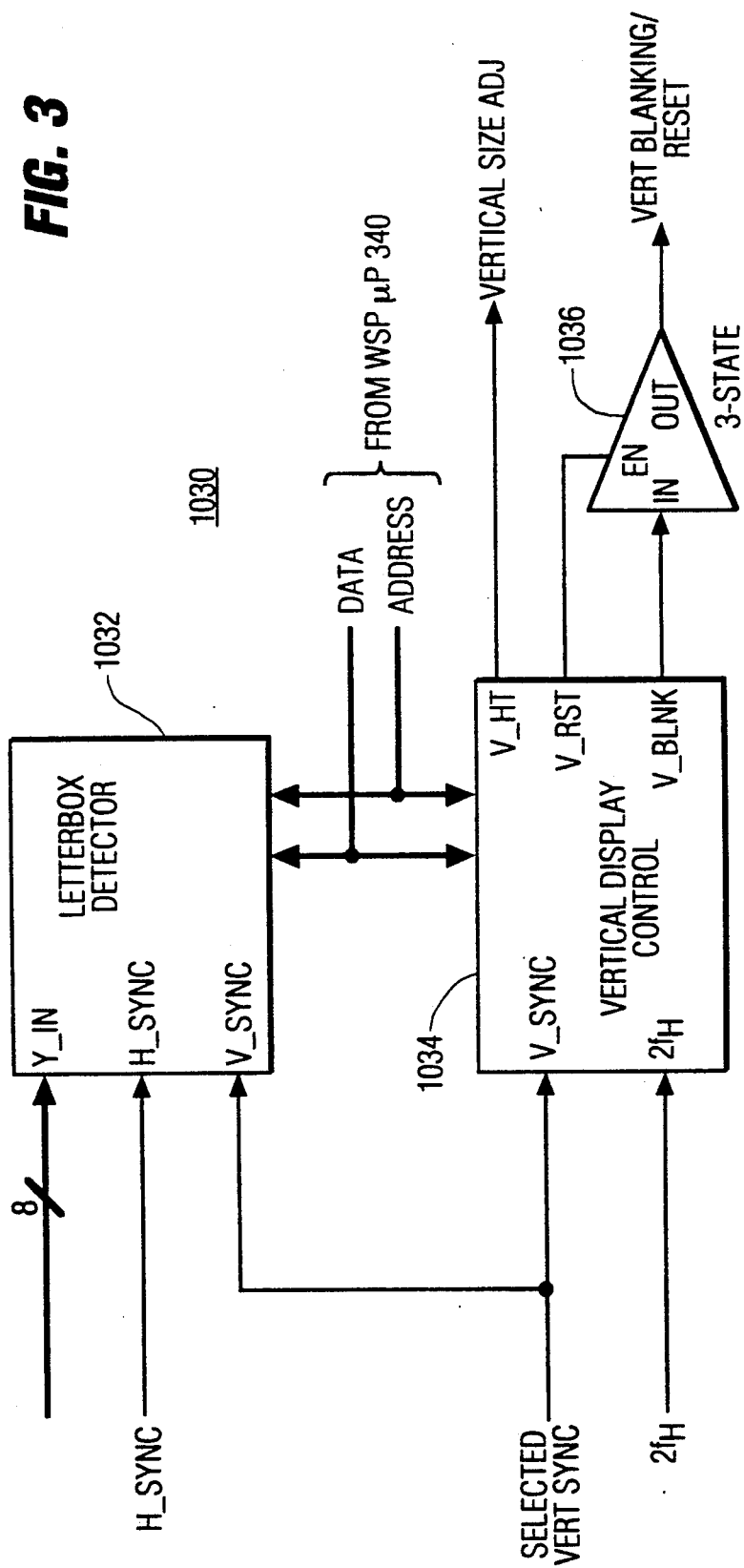
FIG. 3 is a block diagram showing a vertical size control circuit, including a letterbox detector.

FIG. 3 illustrates an automatic letterbox detector as part of a vertical size control circuit 1030. The vertical size control circuit comprises a letterbox detector 1032, a vertical display control circuit 1034 and a three-state output device 1036. Alternatively, the vertical blanking and vertical reset pulses can be transmitted as separate signals. The automatic letterbox detection circuit can automatically implement vertical zoom or expansion, typically by expanding a 4×3 format display ratio signal which includes a 16×9 format display ratio letterbox of active display area, and unused or matte colored top and bottom border areas. The letterbox detector can locate the active portion of the video by monitoring for a change in luminance between a given video line and a previous line, and controls expansion of the displayed the signal by a variable amount such that the first and last active video lines occupy the top and bottom of the display. Alternatively, the letterbox detector can be arranged to switch between discrete standard display ratios, such as necessary to zoom the 16×9 portion of a 4×3 signal to fill a 16×9 screen. When the output signal VERTICAL SIZE ADJ becomes active in that case, the display is zoomed. The deflection height is increased by 4/3 (see FIG. 2), which enables the active video portion of the letterbox signal to fill the wide screen display, without image aspect ratio distortion.

The vertical display control circuit 1034 also controls which part of the overscanned raster will be displayed on the screen, a feature referred to as vertical panning. If the vertically overscanned video signal is not in letterbox format, the conventional display format picture can be zoomed, that is expanded, to simulate a wide screen format. In this case, however, the portions of the picture cropped by the 4/3 vertical overscan will contain active video information. It is necessary to vertically crop ⅙ of the picture. In an AC-coupled vertical deflection system, and absent further controls, the top 1/6 and the bottom 1/6 will always be cropped. However, picture content may dictate that more of the top than the bottom of the picture is more appropriately cropped, or vice versa, in order that the more interesting part of the signal is saved, at the expense of a less interesting part. If all the action is at ground level, for example, a viewer might prefer to crop more sky. A vertical panning capacity enables a choice as to which part of the zoomed picture will be shown and which part will be cropped. Vertical panning is explained with reference to FIGS. 4 and 5(a) through 5(c). The three level composite vertical blanking/reset signal is shown at the top of the timing diagram in FIG. 4. These signals can be generated separately. The vertical blanking pulse begins when the signal L_COUNT is equal to VRT_BLNK0 and ends when L_COUNT is equal to VRT_BLNK1. The vertical reset pulse starts when L_COUNT is equal to VRT_PHASE. The L_COUNT is the output of a ten bit counter used to keep track of horizontal half lines with respect to the leading edge of VSYNC_MN. VSYNC_MN is the synchronized version of VDRV_MN, the vertical synchronizing component of the main signal provided to the gate array. VRT_BLNK0 and VERT_BLNK1 are provided by a microprocessor depending on the vertical panning command. VER_PHASE programs the relative phase of the VERT_RST output with respect to the rising edge of the vertical synchronizing component in the COMP_SYNC output. The COMP_SYNC output is the output of a J-K flip/flop. The state of the flip/flop is determined by decoding the outputs of L_COUNT and H_COUNT. H_COUNT is the horizontal position counter. The L_COUNT counter is used to segment the COMP_SYNC signal into three segments corresponding to the horizontal synchronizing pulse, the equalization pulse and the vertical synchronizing pulse.

Figure 4:
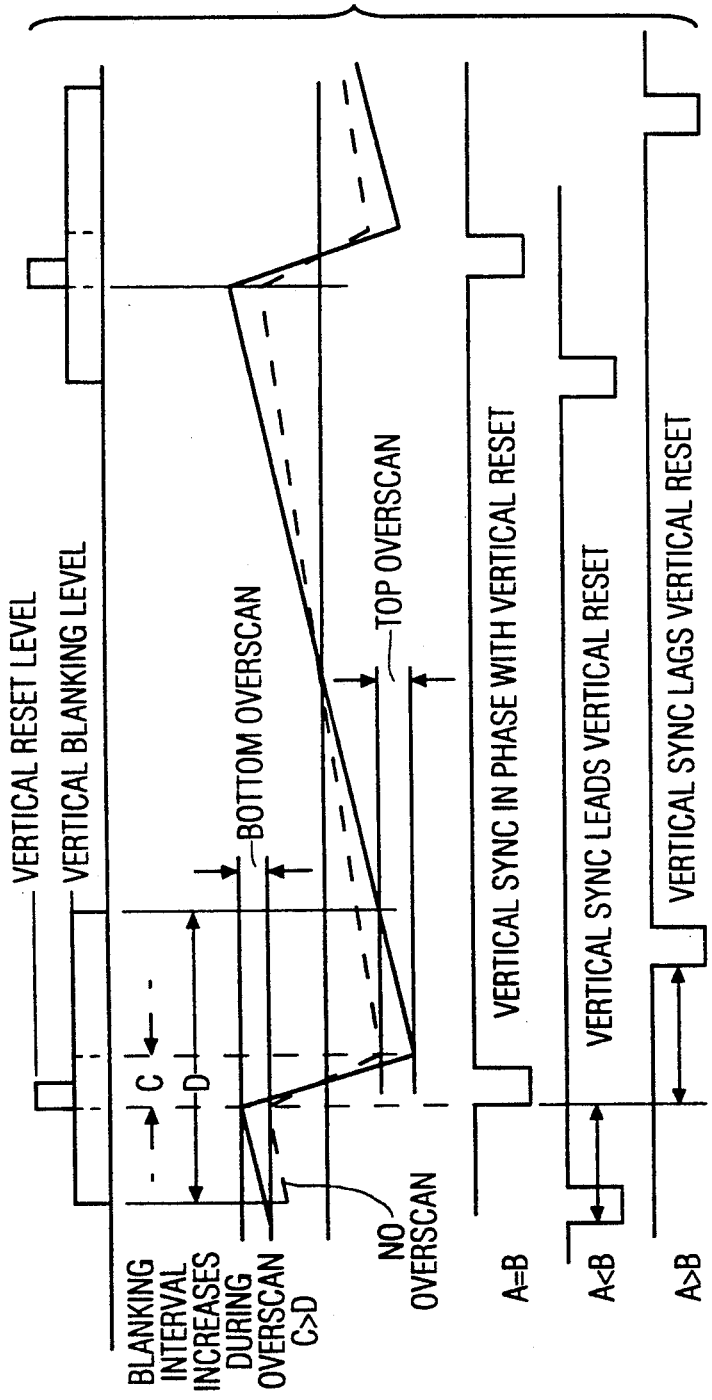
FIG. 4 is a timing diagram illustrating aspects of vertical panning.

A vertical deflection current for "no" overscan (which actually corresponds to a nominal 6% overscan) is shown by dotted lines in FIG. 4, as is the corresponding vertical blanking signal. The width of the vertical blanking pulse for no overscan is C. The vertical synchronizing pulse is in phase with the vertical reset pulse. A vertical deflection current for the overscan mode is shown by a solid line in FIG. 4, as is the corresponding vertical blanking pulse, having a pulse width D.

Figure 5C:
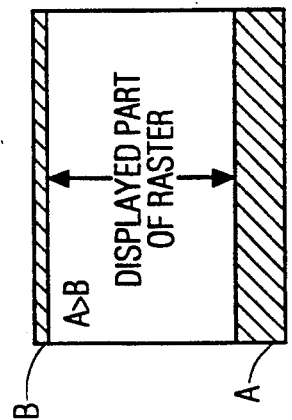
FIGS. 5(a)-5(c) are display format diagrams useful for explaining aspects of vertical panning in connection with FIG. 4.
Figure 5B:
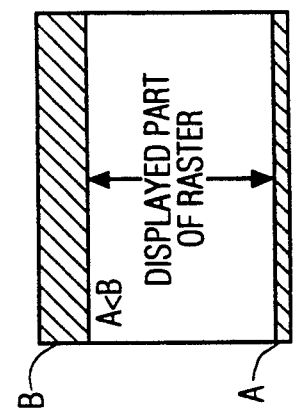
Figure 5A:
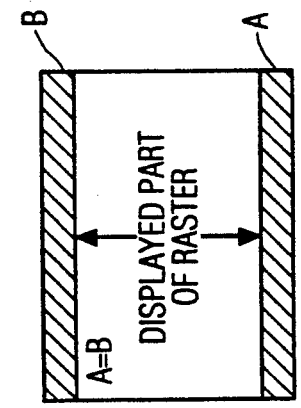

If the bottom overscan A is equal to the top overscan B, the display will be centered as shown in FIG. 5(a). If the vertical reset pulse is generated so as to lag the vertical synchronizing pulse, the bottom overscan A is less than the top overscan B, resulting the in display shown in FIG. 5(b), where more of the lower part of the picture is displayed while more of the top is blanked.

conversely, if the vertical reset pulse is generated so as to lead the vertical synchronizing pulse, the bottom overscan A is more than the top overscan B, resulting in the display shown in FIG. 5(c). More of the upper part of the picture is displayed and more of the bottom is blanked. The relative phase of the vertical synchronizing signal and the vertical reset signal is controllable the microprocessor WSP μP of the wide screen processor 30, to enable vertical panning during overscan modes of operation. It will be appreciated that the overscanned raster remains vertically centered, or symmetrical, on the picture tube or screen during vertical panning. It is the blanking interval which can be vertically moved, or positioned asymmetrically relative to the raster so as to blank more of the picture at the top than at the bottom, or vice versa.

One problem that is encountered when vertical panning is used occurs during special effects modes of VCR playback. It is desired to pan the video up (which can also be thought of as scrolling the displayed image down) by a slight amount (for example four or five lines), the vertical reset pulse is actually delayed from vertical sync by 262.5 lines, less the number of lines of the pan value. In the fast forward mode of a VCR, due to the non-standard nature of the linear tape speed, the number of lines in a field decreases by a number which is dependent on the recording mode (for example, SP or SLP) and the linear tape speed. A nominal number of lines per field contained in fast forward mode of VCR playback (SP mode) could be 253.5 lines. If the desired panning value is down by 5 lines, the delay setting would be for 257.5 lines. However, a new VSYNC occurs every 253.5 lines, resetting the half line counter which would generate vertical reset upon reaching the desired panning delay count. During this mode, a vertical reset will not occur because the half line counter will be repetitively reset without ever reaching the desired value, causing a collapse of the vertical raster and possible tube damage. It is thus necessary to ensure the occurrence of a vertical reset pulse regardless of the phase of VSYNC and the delay setting for vertical reset.

Figure 6:
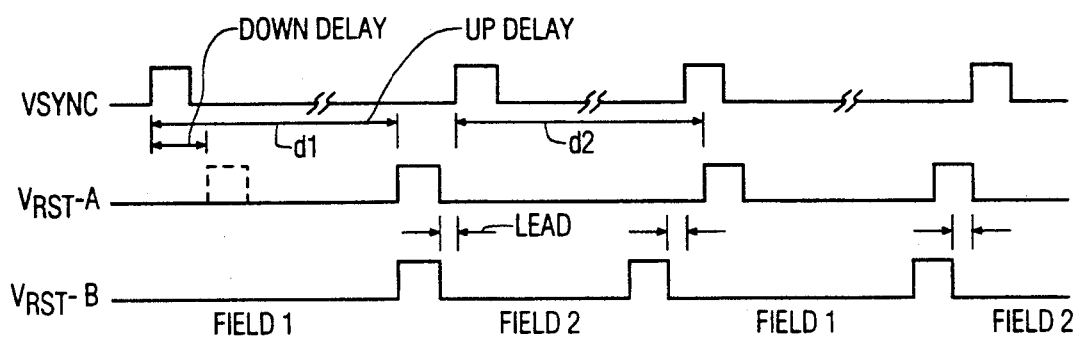
FIG. 6 is a timing diagram illustrating the relationship of vertical sync and vertical reset signals, useful in explaining the operation of the invention.

FIG. 6 shows the timing problems associated with a panning circuit which can occur where field lengths are unequal and/or not of a standard number of lines. The panning "up delay" and the panning "down delay" are shown relative to the leading edge of a vertical sync preceding field 1. The vertical reset pulse for panning down is shown in broken lines in signal $V_{RST}$-A, and the vertical reset pulse for panning up is shown in solid lines. Of course it is only possible to pan in one direction at a time.

As shown in FIG. 6, the panning up delay d1 for field 1 is sufficient to place the generated vertical reset slightly before the next vertical sync, as needed for panning up. However, if field 2 is not the same number of lines as field 1, a delay d2 of the same amount as d1 will place the vertical reset incorrectly. In the example shown, the vertical reset $V_{RST}$-A in field 2 actually would occur after the vertical sync preceding field 2. Whereas the vertical sync is the point of reference, the line counter which determines the panning delay is normally reset by the vertical sync, and without special provisions, the vertical reset could be lost by the vertical sync continually resetting the delay line counter before the necessary delay interval elapsed.

Figure 7:
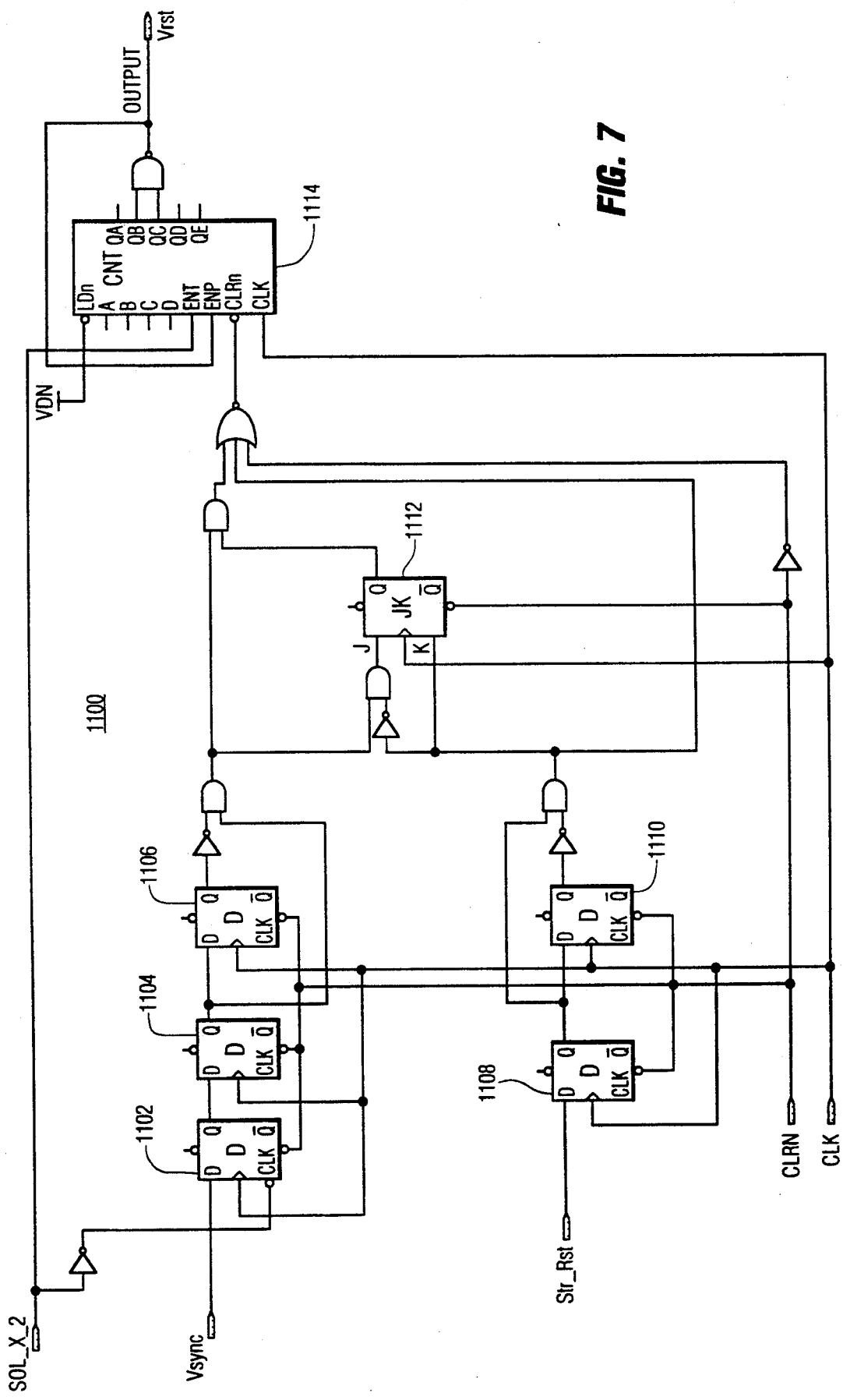
FIG. 7 is a circuit diagram illustrating a means for generating a forced vertical reset.

The correct vertical reset needs to precede the next vertical $V_{SYNC}$ by an unvarying amount, as shown by $V_{RST}$-B in FIG. 6. A circuit which forces a vertical reset $V_{RST}$-B is shown in FIG. 7. The basic circuit 1100 comprises a plurality of D-type flip/flops 1102, 1104, 1106, 1108 and 1110, a J-K flip/flop 1112 and a counter 1114, as well as a number of AND gates, NOR gates and inverters. The circuit is operated synchronously with a clock signal, which can be synchronized with the video, e.g., at $1024f_H$. The basic operation is as follows. The vertical sync signal is sampled by a signal designated SOL_X_2, which is a one clock wide pulse occurring twice per horizontal line period. Vertical sync has been processed in a way that it is offset from SOL_X_2, for example by 1/16 or ⅛ of a line period. Sampling vertical sync with SOL_X_2 realigns vertical sync with SOL_X_2. The STR_RST signal is a positive going pulse that is ½ of a line period long. The leading edge of this pulse signifies the beginning of the desired vertical reset interval. If the number of lines in a field are greater than or equal to the delay setting used to generate the STR_RST signal, the leading edge of STR_RST is used to clear counter 1114, which then counts for the desired vertical reset length and then disables itself. Vertical reset signal $V_{RST}$ is generated by a gate coupled to the output of counter 1114, and $V_{RST}$ is high (enabling the counter) during the vertical reset pulse. In this implementation, the desired vertical reset length is six half lines, the gate being coupled to the two and four bit counter outputs. Vertical reset lengths of other than six half lines may be selected by using the required counter outputs together with any gates needed to decode the outputs.

For the case where the number of lines in a field is less than the delay setting used to generate the STR_RST signal, the circuit ensures that a vertical reset is produced. On the leading edge of the sampled vertical sync signal, J-K flip/flop 1112 is set. The output of this flip/flop is used as an enable signal for gating through a trigger signal for the vertical reset on the next sampled vertical sync signal VSYNC, namely if J-K flip/flop 1112 has not in the meanwhile been reset by the occurrence of STR_RST. If an STR_RST pulse has not occurred since flip/flop 1112 was set, the leading edge of the next sampled vertical sync signal clears the counter 1114 used to generate the $V_{RST}$ signal. Signal $V_{RST}$, generated from a gate on the outputs of the counter, then goes high until counter 1114 accumulates the required count of half lines from SOL_X_2. In this manner, it is assured that as long as a VSYNC signal is present, a $V_{RST}$ pulse will be generated of the correct length regardless of the number of lines in a field or the delay setting desired for the STR_RST signal. If a STR_RST pulse does not occur, the leading edge of that signal clears the J-K flip/flop and generates a $V_{RST}$ signal based on the STR_RST pulse.

Referring again to FIG. 6, both panning up and panning down may be accomplished by delaying the vertical reset signal by an amount less than or equal to one field. For NTSC, panning down is accomplished by counting a delay or zero to 262.5 half lines; and panning up is accomplished by counting a delay between 262.5 and 525 half lines. A problem with this approach is that for nonstandard signals the field lengths may not be equal. One example is the pause mode for a dual azimuth four head VCR. Whereas the field lengths are unequal, counting for greater than one half of a field for panning up (scrolling down) causes the two fields in the frame to become misaligned by a number of lines equal to the difference in the field lengths. A severe interline flicker thus occurs. What is needed is a circuit which references the panning delay for panning down to the VSYNC at the beginning of the field, and for panning up to the VSYNC which follows the field. This is accomplished according to the invention by coupling a line count signal (for example a half-line count) to a counter and latches which store the total number of lines in each field. The pan up delay for each new field is then calculated from the total number of lines in the previous occurrence of the same field, less the variable amount of panning which is required by the processor.

Figure 8:
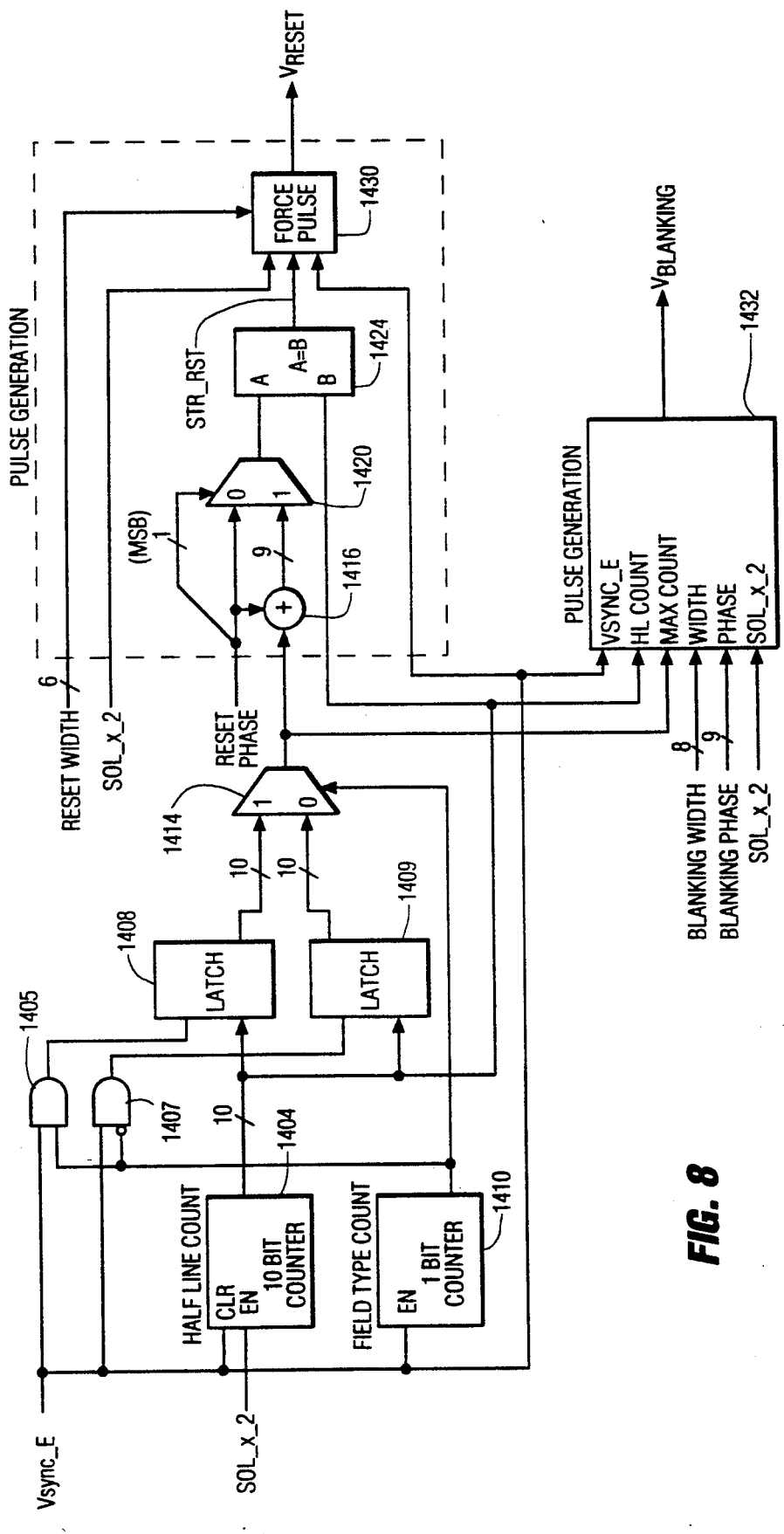
FIG. 8 is a block diagram of a circuit for monitoring successive field lengths and generating vertical reset and blanking pulses which accurately reflect the field lengths, in accordance with aspects of the invention.
Figure 11A:
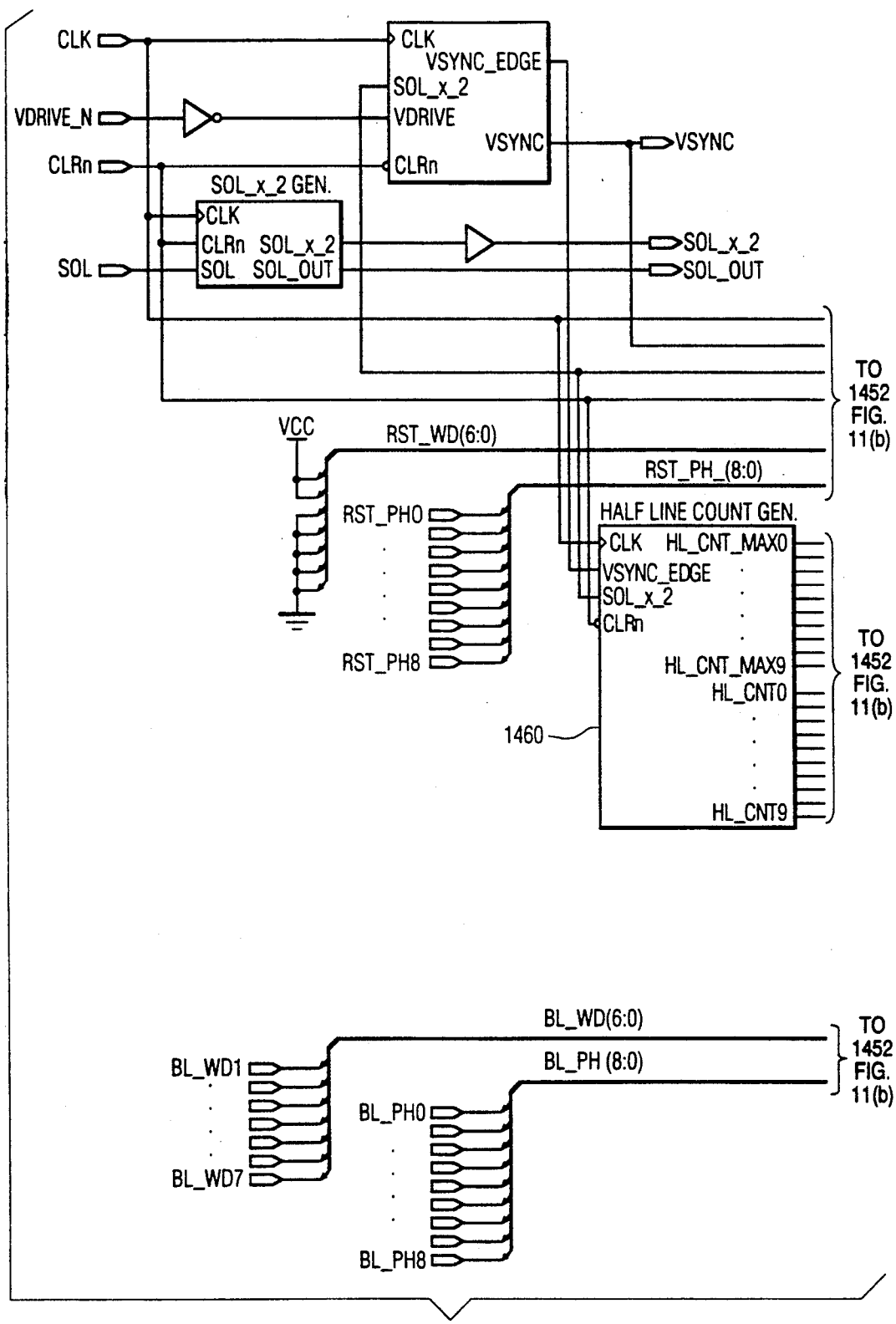
FIGS. 11A and 11B are detailed circuit diagram showing an implementation of a parallel circuit for generating both vertical reset and vertical blanking pulses as indicated by the circuit according to FIG. 8.
Figure 11B:
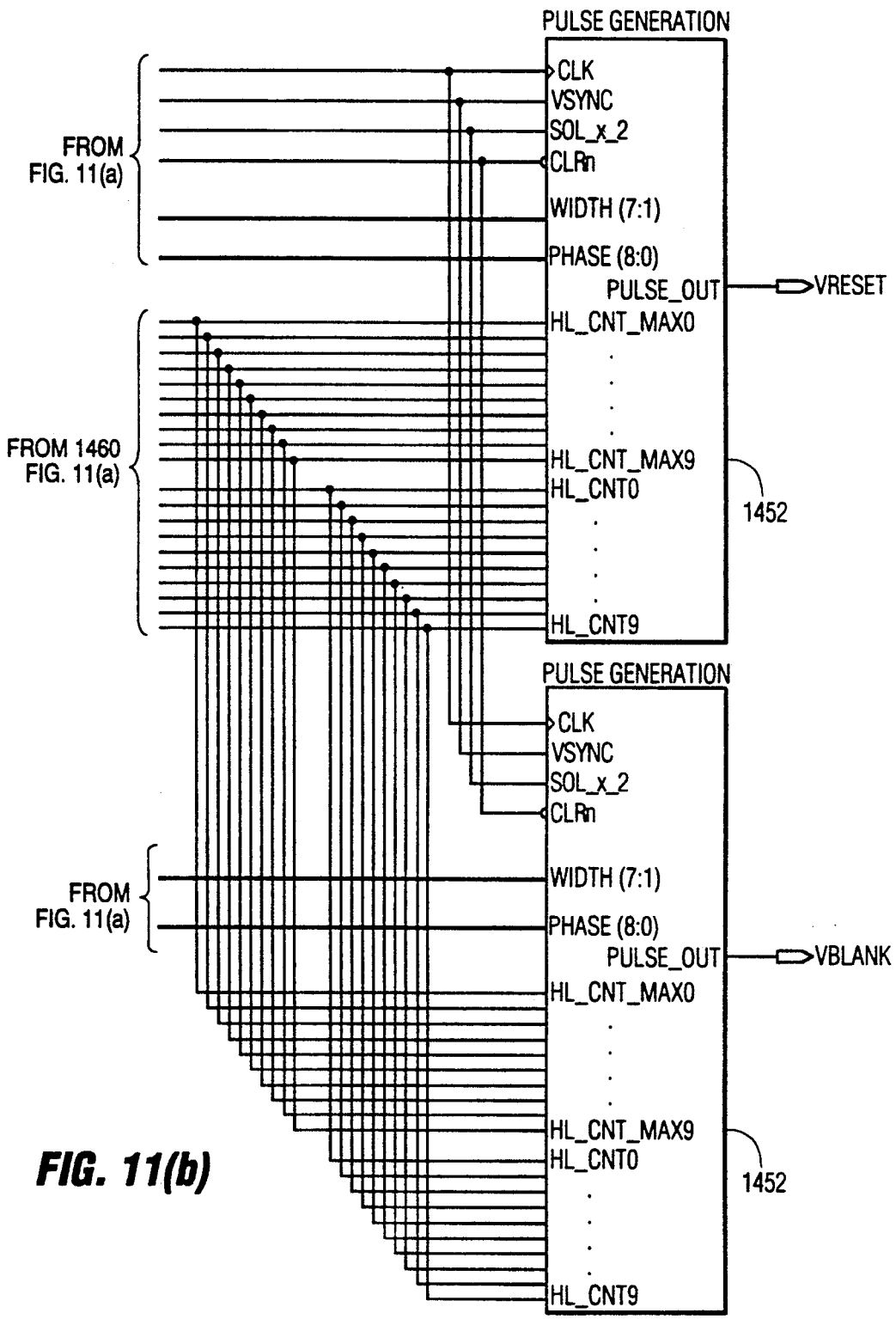

Referring to FIG. 8, the wide screen processor provides vertical reset phase and vertical blanking phase information to the panning delay circuit. The phase information can be, for example, in the form of nine bit two's complement data, representing either a forward delay relative to the most recent vertical sync signal on the video signal, or a negative "delay" relative to the next vertical sync signal, i.e., a delay of somewhat less than a full field, causing the vertical reset to precede the vertical sync for the next field. Additionally, the wide screen processor provides pulse width information. As shown in FIGS. 8 and 11, the same form of circuit can be provided for generating the vertical reset pulse and the vertical blanking pulse. The processor chooses the pulse width and delay line count for both vertical reset and blanking to complement one another. The delay line count can be, for example, a nine bit half line count, and the pulse width can be six bits (for reset) or eight bits (for blanking). The pulse width can be defined by loading this width data from the processor into a counter, and counting down the counter during the pulse. Alternatively, a comparator can be provided for disabling the pulse when a counter counts up to the required number.

In FIG. 8, signal SOL_X_2 is a one clock wide pulse occurring twice per horizontal line, and is coupled to ten bit counter 1404. The number of half-lines since the previous occurrence of VSYNC is counted by ten bit counter 1404, and on the leading edge of VSYNC (via a one clock wide pulse VSYNC_E) the count is stored in latch 1408, one for storing the total number of half-lines in each field.

A toggling circuit comprising one-bit counter 1410 is coupled to VSYNC_E for determining whether the first or second field is the present field. With each occurrence of VSYNC_E, one-bit field counter 1410 changes state, and enables loading of the contents of counter 1404 into latch 1409. VSYNC_E also clears counter 1404 in preparation for the next field.

The one bit counter 1410 controls multiplexer 1414, for applying the contents of one of the two latches 1408 and 1409 to adder 1416. Also coupled to the adder, and to a further multiplexer 1420 is the desired phase data, which can be positive (for panning down) or negative (for panning up). The most significant bit of the phase data (which indicates whether the two's complement word is positive or negative) controls multiplexer 1420. The sign bit of the phase data determines whether the phase data is used directly (if the phase is positive, indicating panning down) or added to the line count for that field (if the phase is negative, indicating panning up).

The output of multiplexer 1420 is coupled to one input of comparator 1424, and the present half line count from counter 1404 is coupled to the other input of comparator 1424. When the half-line count of the present field equals either the pan up delay line count, or the total number of lines in the last occurrence of that field less the number of lines defining the lead between vertical reset and the next VSYNC for panning down, signal STR_RST is generated and applied to force-pulse circuit 1430. The force-pulse circuit is similar to that of FIG. 6, except the pulse width is provided by the processor rather than being predetermined by gating.

The pulse generation section operable to produce the vertical reset pulse is substantially identical to the pulse generation circuit 1432 operable to produce a vertical blanking pulse, the difference being that the number of bits needed to specify the phase delay (or advance) and the pulse width are different for vertical reset and vertical blanking.

Figure 9:
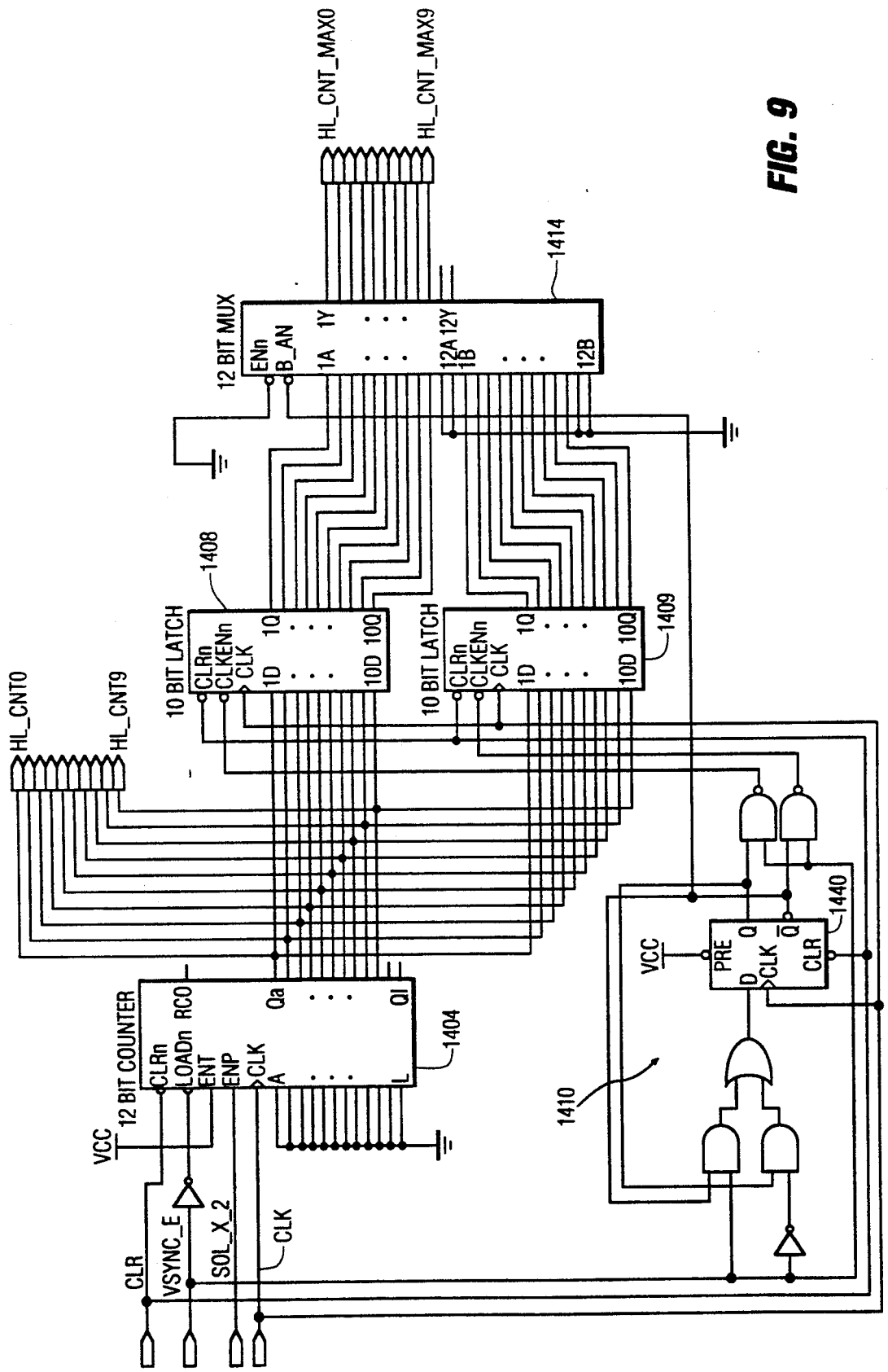
FIG. 9 is a detailed circuit diagram showing an implementation of the counter, latches and multiplexer portion of the circuit according to FIG. 8.
Figure 10A:
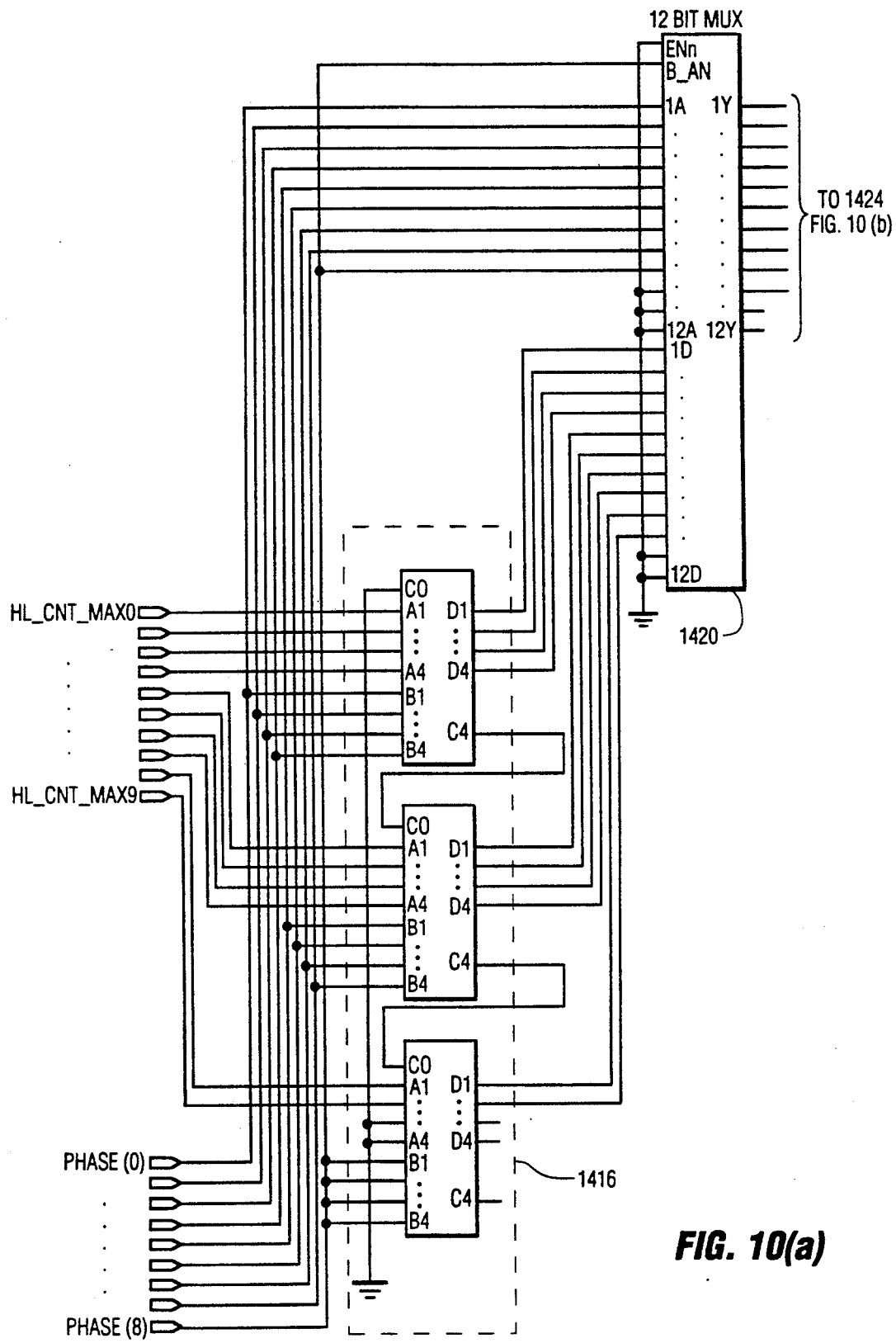
FIGS. 10A, 10B are detailed circuit diagram showing an implementation of the adder, pan multiplexer and comparator portion of the circuit according to FIG. 8.
Figure 10B:
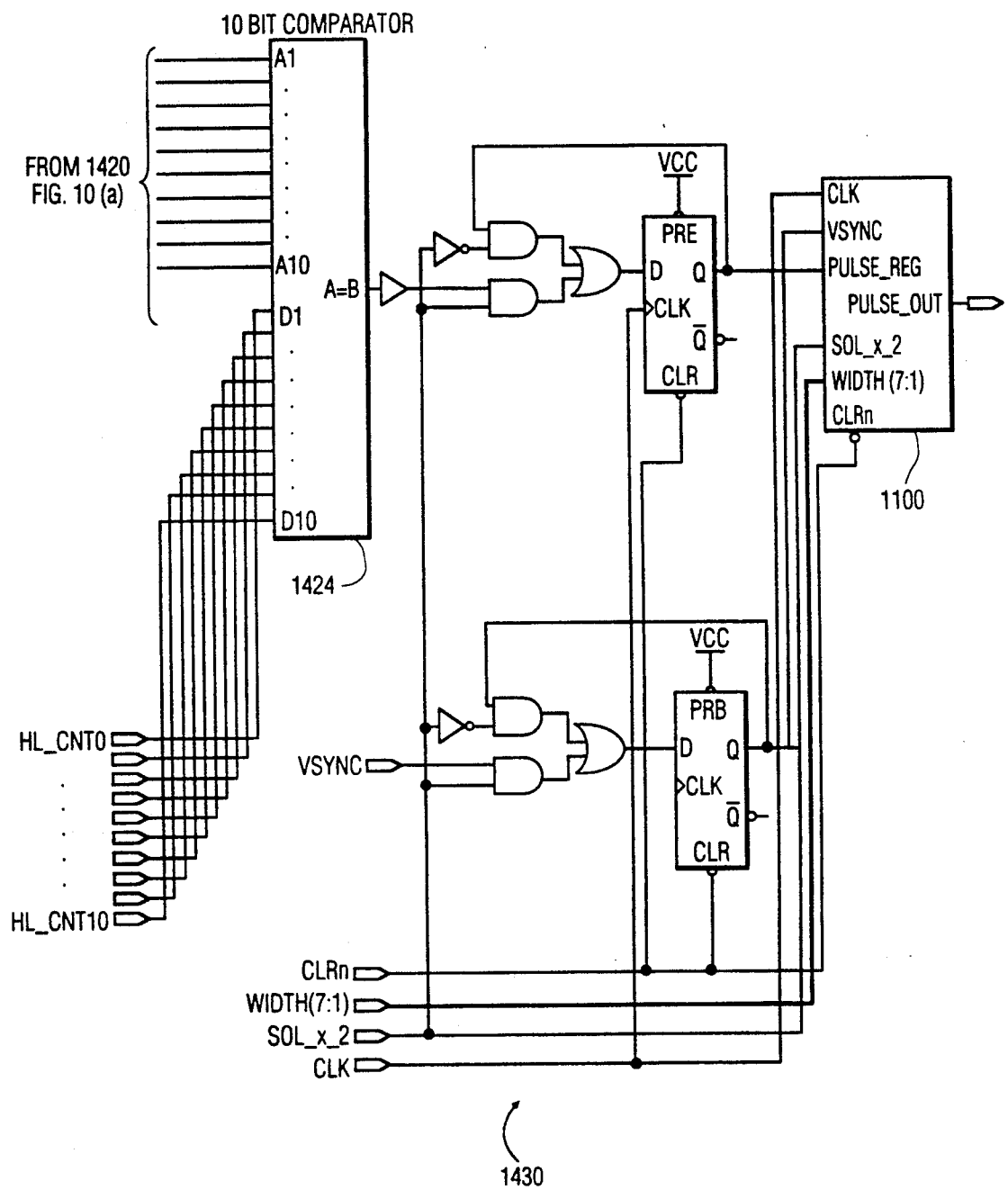

FIGS. 9 and 10 illustrate a specific embodiment of the invention in detail, and FIG. 11 illustrates how the vertical reset and vertical blanking pulse generation sections can be driven from the same line counting means. The same reference numbers have been used in these drawings to identify the circuit elements discussed with reference to FIG. 8. The 10 bit half line counter 1404, latches 1409 and multiplexer 1414 are embodied as shown in FIG. 8, however, the one bit counter is embodied as a D-type flip/flop 1440, and associated gating so as to form a toggling circuit which changes state at each occurrence of VSYNC_E, for selecting one of the latches 1409 and one set of inputs to the multiplexer 1414 for presentation on the output.

In FIG. 10, the adder 1416 is embodied as a series of three four-bit adders in cascade. Either the sum of the vertical phase data and the total line count, or the vertical phase data without modification, are selected by multiplexer 1420 as a function of the sign bit of the phase data and the selected one is coupled to comparator 1424. When the present line count as indicated by counter 1404 equals the required line count, the output of comparator 1424 provides a pulse to pulse-force circuit 1430. The pulse-force circuit includes a circuit 1100 as shown in FIG. 7 for allowing VSYNC to generate the vertical reset pulse in the event that STR_RST does not occur before a second VSYNC occurs, thereby preventing collapse of the raster.

In FIG. 7, the vertical reset pulse width was determined by gating coupled to the outputs of a pulse width counter, the gating forming a comparator operable to disable the counter and end the reset pulse when the count is reached. In FIG. 10, the pulse width is variable under control of the processor. The pulse width required can be loaded into a count-down counter for determining the pulse width, or a comparator can be provided for comparing the contents of a counter 1114 to the required pulse width, in which case the circuit could operate substantially as in FIG. 7.

FIG. 11 demonstrates a particular embodiment wherein both the vertical reset pulse and the vertical blanking pulse are generated by parallel circuits 1452 coupled to the outputs of a half line counter, latch, multiplexer and adder circuit 1460, as shown more specifically in FIGS. 9 and 10. By varying the panning delay and respective pulse widths for the vertical reset and blanking in complementary manner, the processor can accomplish accurate panning even in nonstandard modes of operation such as the pause and search modes of VCR playback, wherein the field lengths may be of variable and/or unequal lengths.

What is claimed is:
1. A television apparatus, comprising:
  means for displaying a video signal representing a picture and having a vertical synchronizing com- ponent defining successive vertical scanning intervals;

means for measuring the lengths of said successive vertical scanning intervals;

means for generating a vertical reset signal which is phase shifted relative to said vertical synchronizing component of said video signal for vertically panning said picture on said video display means; and, means for adjusting said phase shift in accordance with variable lengths of said vertical scanning intervals.

2. The apparatus of claim 1, wherein operation of said adjusting means comprises:

a first mode of operation for panning said picture down, in which said vertical reset signal is generated when the length of a vertical scanning interval being measured reaches a value corresponding to said phase shift: and, a second mode of operation for panning said picture up in which said vertical reset signal is generated when the length of a vertical scanning interval being measured reaches a value corresponding to a difference between: (a) the measured length of a preceding vertical scanning interval having the same field type as said vertical interval being measured: and, (b) said phase shift.

3. The apparatus of claim 2, wherein said adjusted phase shift is utilized for generating said phase shifted vertical reset signal for a subsequent vertical scanning interval.

4. The apparatus of claim 1, wherein said adjusted phase shift is utilized for generating said phase shifted vertical reset signal for a subsequent vertical scanning interval.

5. The apparatus of claim 1, further comprising an AC coupled vertical deflection system for vertical scanning.

6. The apparatus of claim 1, wherein said video display means comprises a wide screen video display unit having a horizontal to vertical aspect ratio greater than 4:3.

7. The apparatus of claim 6, wherein said aspect ratio of said wide screen display unit is approximately 16:9.

8. A television apparatus, comprising:

means for displaying a video signal representing a picture and having a vertical synchronizing component defining fields of horizontal lines which can have a variable number of said horizontal lines per field under certain operating conditions;

means for measuring the number of horizontal lines in each of said fields;

panning means for initiating a vertical reset signal shifted relative to said vertical synchronizing component of said video signal by a selected number of horizontal lines for vertically panning said picture on said video display means; and, means for adjusting said selected number of horizontal lines responsive to said measured lengths of said fields to maintain said vertical panning by said selected number of horizontal lines even under said certain operating conditions.

9. The apparatus of claim 8, wherein operation of said adjusting means comprises;

a first mode of operation for panning said picture down, in which said vertical reset signal is generated when the length of a field being measured reaches a value corresponding to said selected number of horizontal lines; and, a second mode of operation for panning said picture up in which said vertical reset signal is generated when the length of a field being measured reaches a value corresponding to a difference between; (a) the measured length of a preceding vertical scanning interval having the same field type as said vertical interval being measured; and, (b) said selected number of horizontal lines.

10. The apparatus of claim 9, wherein said adjusted number of horizontal lines is utilized for generating said vertical reset signal for a subsequent field.

11. The apparatus of claim 8, wherein said adjusted adjusted number of horizontal lines is utilized for generating said vertical reset signal for a subsequent field.

12. The apparatus of claim 8, wherein said video display means comprises a wide screen video display unit having a horizontal to vertical aspect ratio greater than 4:3.

13. The apparatus of claim 12, wherein said aspect ratio of said wide screen display unit is approximately 16:9.

14. The apparatus of claim 2, further comprising means responsive to a sign-bit of said phase shift for selecting between said first and second modes of operation, said sign-bit having a first polarity for panning down and an opposite polarity for panning up.

15. The apparatus of claim 1, wherein said measuring means comprises:

first and second counters;

first and second latches coupled to said first counter;

means coupled to said first and second latches for selecting which of said first and second latches loads an input from said first counter; and, a multiplexer responsive to said second counter for selecting an output between said first and second latches.

16. The apparatus of claim 15, wherein said adjusting means comprises:

a second multiplexer for selecting as an output between:

(a) successive ones of said phase shifts; and, (b) an algebraic sum of said successive ones of said phase shifts and successive ones of said measured lengths, said second multiplexer being responsive to a sign-representative bit of said phase shift; and, a comparator for generating an output signal for initiating said vertical reset signal when the length of a vertical interval being measured reaches the output value of said second multiplexer.

17. The apparatus of claim 1, wherein said adjusting means comprises:

a multiplexer for selecting as an output between:

(a) successive ones of said phase shifts; and, (b) an algebraic sum of said successive ones of said phase shifts and successive ones of said measured lengths, said multiplexer being responsive to a sign-representative bit of said phase shift; and, a comparator for generating an output signal for initiating said vertical reset signal when the length of a vertical interval being measured reaches the output value of said multiplexer.

18. The apparatus of claim 1, wherein successive numbers of said vertical scanning intervals define interlaced video fields.

19. The apparatus of claim 9, further comprising means responsive to a sign-bit of said phase shift for selecting between said first and second modes of operation, said sign-bit having a first polarity for panning down and an opposite polarity for panning up.

20. The apparatus of claim 8, wherein said measuring means comprises:
   first and second counters;
   first and second latches coupled to said first counter;
   means coupled to said first and second latches for selecting which of said first and second latches loads an input from said first counter; and,
   a multiplexer responsive to said second counter for selecting an output between said first and second latches.

21. The apparatus of claim 20, wherein said adjusting means comprises:
   a second multiplexer for selecting as an output between:
      (a) successive ones of said selected number of horizontal lines; and,
      (b) an algebraic sum of said successive ones of said selected number of horizontal lines and successive ones of said measured lengths,
   said second multiplexer being responsive to a sign-representative bit of said phase shift; and,
   a comparator for generating an output signal for initiating said vertical reset signal when the length of a field being measured reaches the output value of said second multiplexer.

22. The apparatus of claim 8, wherein said adjusting means comprises:
   a multiplexer for selecting as an output between:
      (a) successive ones of said selected number of horizontal lines; and,
      (b) an algebraic sum of said successive ones of said selected number of horizontal lines and successive ones of said measured lengths,
   said multiplexer being responsive to a sign-representative bit of said phase shift; and,
   a comparator for generating an output signal for initiating said vertical reset signal when the length of a field being measured reaches the output value of said multiplexer.

23. The apparatus of claim 8, further comprising an AC coupled vertical deflection system for vertical scanning.

24. A television apparatus, comprising:
   means for displaying a video signal representing a picture;
   means for generating a vertical reset signal which is phase shifted relative to said vertical synchronizing component of said video signal for vertically panning said picture on said video display means; and,
   means for adjusting said phase shift in accordance with variable lengths of scanning intervals of said video signal.

25. The apparatus of claim 24, further comprising means for measuring the lengths of said scanning intervals.

26. The apparatus of claim 24, wherein operation of said adjusting means comprises:
   a first mode of operation for panning said picture down, in which said vertical reset signal is generated when the length of a scanning interval reaches a value corresponding to said phase shift; and,
   a second mode of operation for panning said picture up in which said vertical reset signal is generated when the length of a scanning interval reaches a value corresponding to a difference between: (a.) the length of a preceding scanning interval having the same field type as said scanning interval being measured; and, (b.) said phase shift.

* * * * *